United States Patent
Mikajiri et al.

(10) Patent No.: US 11,383,420 B2
(45) Date of Patent: Jul. 12, 2022

(54) RESIN BOTTLE AND METHOD FOR MAKING THE SAME

(71) Applicant: THE COCA-COLA COMPANY, Atlanta, GA (US)

(72) Inventors: Naoto Mikajiri, Tokyo (JP); Manabu Inomata, Tokyo (JP)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 15/774,877

(22) PCT Filed: Jan. 10, 2017

(86) PCT No.: PCT/IB2017/000226
§ 371 (c)(1),
(2) Date: May 9, 2018

(87) PCT Pub. No.: WO2017/098488
PCT Pub. Date: Jun. 15, 2017

(65) Prior Publication Data
US 2018/0326647 A1    Nov. 15, 2018

(51) Int. Cl.
*B29C 49/12*    (2006.01)
*B29C 49/06*    (2006.01)
(Continued)

(52) U.S. Cl.
CPC ............... *B29C 49/12* (2013.01); *A23L 2/54* (2013.01); *B29B 11/14* (2013.01); *B29C 45/372* (2013.01);
(Continued)

(58) Field of Classification Search
CPC ............... B65D 85/73; A23V 2002/00; A23V 2200/226; A23V 2250/046;
(Continued)

(56) References Cited

U.S. PATENT DOCUMENTS 5,788,111 A * 8/1998 Waugh ............... A47G 19/2233
220/608
2009/0011157 A1   1/2009 Sigler et al.
(Continued)

FOREIGN PATENT DOCUMENTS

EP      1896236 A1    3/2008
JP      H05169521 A   7/1993
(Continued)

OTHER PUBLICATIONS

Gadelmawla et al., Roughness parameters, Jan. 14, 2002, Journal of Materials Processing Technology 123, p. 133-145 <https://www.researchgate.net/publication/255857862_Roughness_parameters>(Year: 2002).*

(Continued)

*Primary Examiner* — Erik Kashnikow
*Assistant Examiner* — Thanh H Nguyen
(74) *Attorney, Agent, or Firm* — Eversheds Sutherland (US) LLP (57) ABSTRACT

To provide a resin container and a method for manufacturing the same with which it is possible to generate more effervescence than hitherto. This resin container is provided with: a resin container main body inside which is formed an accommodating space that is hermetically sealed using a cap; and a textured region which is formed on an inner surface of the container main body and is formed from a rough surface.

13 Claims, 10 Drawing Sheets

(51) Int. Cl.
   *B29C 45/37* (2006.01)
   *B65D 1/02* (2006.01)
   *B65D 85/73* (2006.01)
   *B29B 11/14* (2006.01)
   *A23L 2/54* (2006.01)
   *B65D 23/02* (2006.01)
   *B29B 11/08* (2006.01)
   *B29C 37/00* (2006.01)
   *B29K 67/00* (2006.01)
   *B29L 31/00* (2006.01)

(52) U.S. Cl.
   CPC ............ *B29C 49/06* (2013.01); *B65D 1/0261* (2013.01); *B65D 23/02* (2013.01); *B65D 85/73* (2013.01); *A23V 2002/00* (2013.01); *B29B 11/08* (2013.01); *B29B 2911/1402* (2013.01); *B29B 2911/1404* (2013.01); *B29B 2911/14026* (2013.01); *B29B 2911/14033* (2013.01); *B29B 2911/14446* (2013.01); *B29B 2911/14486* (2013.01); *B29B 2911/14966* (2013.01); *B29C 37/0053* (2013.01); *B29C 2049/1223* (2013.01); *B29C 2049/1238* (2013.01); *B29K 2067/003* (2013.01); *B29K 2995/0074* (2013.01); *B29L 2031/7158* (2013.01)

(58) Field of Classification Search
   CPC .... A23V 2250/5026; A23V 2250/5028; A23V 2250/5424; A23V 2250/548
   See application file for complete search history.

(56) References Cited

U.S. PATENT DOCUMENTS

2010/0104697 A1* 4/2010 Kriegel ............. A47G 19/2233
                                                            426/87
2012/0100266 A1   4/2012 Nicholson et al.

FOREIGN PATENT DOCUMENTS

| JP | 05-345350 A | 12/1993 |
| JP | 2007-296720 A | 11/2007 |
| JP | 2010-000670 A | 1/2010 |
| JP | 2010-264723 A | 11/2010 |
| JP | 2012506827 A | 3/2012 |
| JP | 2013-129455 A | 7/2013 |
| JP | 2013129455 A | 7/2013 |
| WO | WO-9303658 A1 * | 3/1993 ......... A47G 19/2233 |
| WO | 2010048488 A1 | 4/2010 |

OTHER PUBLICATIONS

International Preliminary Report on Patentability of Application No. PCT/IB2017/000266 dated May 15, 2018.
Extended European Search Report of Application No. 17728758.8 dated May 27, 2019.
Japanese Patent Office Action of Application No. 2015-220350 dated Aug. 19, 2019.
International Search Report and Written Opinion for PCT/IB2017/000226 dated Aug. 2, 2017.

* cited by examiner

Sample 1

Sample 2

Sample 3

Comparative Example 1

RESIN BOTTLE AND METHOD FOR MAKING THE SAME

CROSS REFERENCE TO RELATED APPLICATIONS

This application is a 35 U.S.C. § 371 National stage application of International Patent Application No. PCT/IB2017/000226, filed Jan. 10, 2017, which claims priority benefit of JP 2015-220350, filed Nov. 10, 2015, both of which are incorporated by reference herein in their entireties.

TECHNICAL FIELD

The present invention relates to resin containers which accommodate beverages, and to preforms for said resin containers.

BACKGROUND ART

It is conventional for PET bottled beverages comprising carbonated beverages to be sold extensively. When, during the manufacture of a PET bottled beverage, a PET bottle is hermetically sealed using a cap after having been filled with a carbonated beverage, the pressure of carbon dioxide gas that has dissolved into the carbonated beverage is balanced by the pressure of gas in a headspace in the PET bottle, thereby stabilizing the carbon dioxide gas and stopping initial effervescence. When a consumer opens the cap after distribution of the PET bottled beverage, the pressure balance discussed hereinabove breaks down, causing the carbon dioxide gas to effervesce.

SUMMARY OF INVENTION

Effervescence of carbon dioxide gas after opening is not only capable of producing a refreshing feeling in the carbonated beverage, but can also accentuate the feeling on the tongue and the flavor of the carbonated beverage, and is therefore a very important element for carbonated beverages. In particular, it preferable to be able to increase the carbon dioxide gas effervescence when the cap is opened. However, consideration has hitherto not been given to increasing such effervescence in PET bottled beverages comprising carbonated beverages.

The present invention takes account of this situation, and the objective thereof is to provide a resin container and a method of manufacturing the same with which it is possible to generate more effervescence than hitherto.

In order to resolve the abovementioned problem, one mode of embodiment of the present invention provides
 a resin container provided with: a resin container main body inside which is formed an accommodating space that is hermetically sealed using a cap; and
 a textured region which is formed on an inner surface of the container main body and is formed from a rough surface.

With such a resin container, a textured region is formed on a bottom surface of the container main body.

Another mode of embodiment of the present invention provides
 a resin container beverage provided with: a carbonated beverage;
 a resin container main body inside which is formed an accommodating space in which the carbonated beverage is accommodated;
 a cap which is attached to a mouth portion of the container main body and which hermetically seals the accommodating space; and
 a textured region which is formed on an inner surface of the container main body and is formed from a rough surface.

Yet another mode of embodiment of the present invention provides
 a resin container preform provided with: a resin main body portion formed in the shape of a bottomed cylinder; and
 a textured pattern which is formed on an inner surface of the main body and is formed from a rough surface.

Yet another mode of embodiment of the present invention provides
 a method for manufacturing a resin container, comprising:
  a step of preparing a resin preform having on an inner surface of a main body portion a textured pattern formed from a rough surface; and
  a step of stretching the preform by blow molding, to mold a resin container having on an inner surface thereof a textured region formed from a rough surface.

Yet another mode of embodiment of the present invention provides
 a method for manufacturing a resin container, comprising:
  a step of disposing in a cavity of a die a resin preform having a main body portion in the shape of a bottomed cylinder; and
  a step of inserting into the preform a stretch rod having on a distal end thereof a texture-imparting pattern formed from a rough surface, and blow-molding the resin container by stretching the preform while pressing the distal end of the stretch rod against the bottom surface of the main body.

Yet another mode of embodiment of the present invention provides
 a method for manufacturing a resin preform, including: a step of disposing in a cavity of a die an inner core having a texture-imparting pattern formed from a rough surface; and
  a step of injecting a molten resin material into the cavity to mold a resin preform having on an inner surface thereof a textured region formed from a rough surface.

Employing the present invention makes it possible to provide a resin container and a method of manufacturing the same with which it is possible to generate more effervescence than hitherto.

MODES OF EMBODYING THE INVENTION

Figure 1:
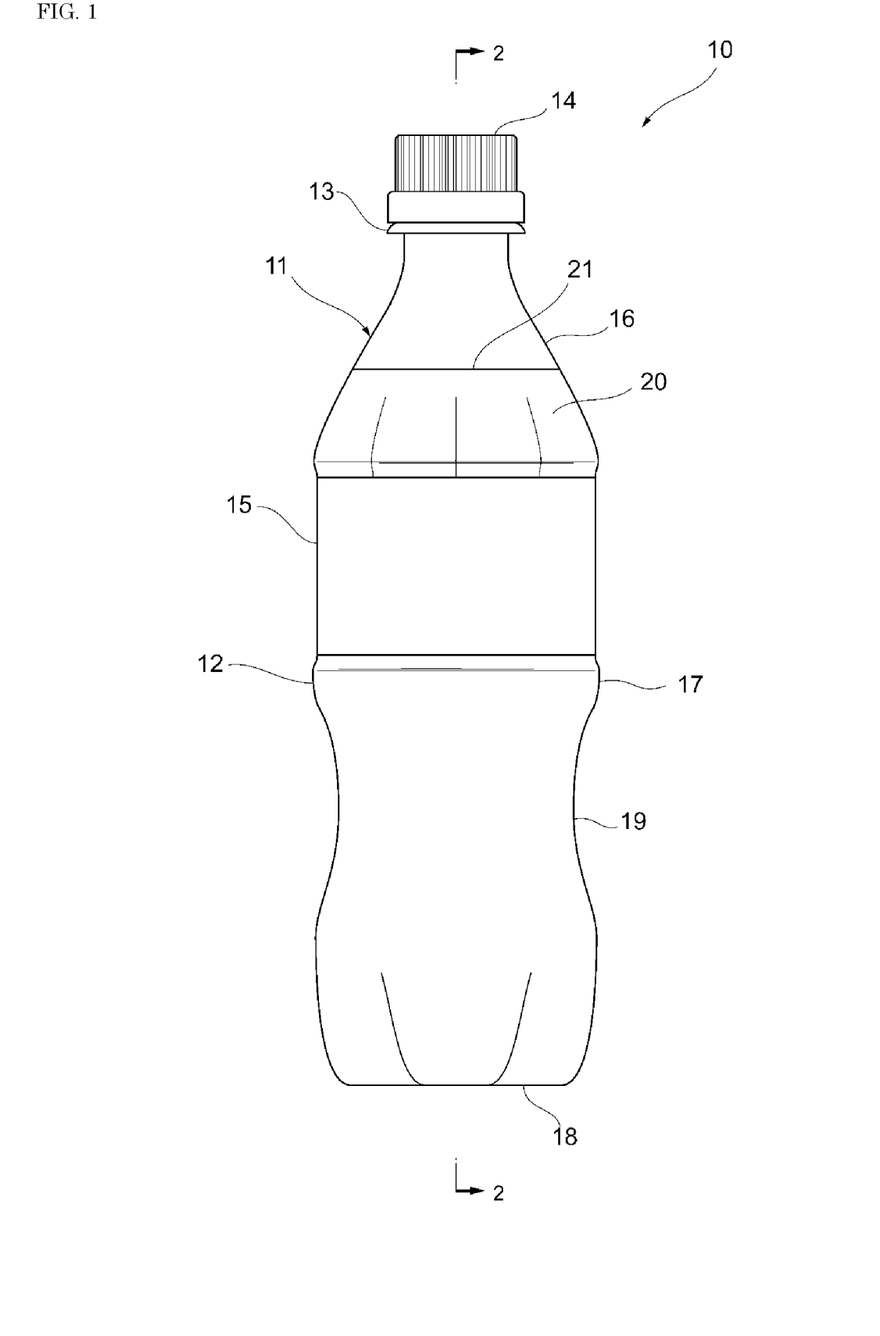
FIG. 1 is a side view illustrating schematically the external appearance of a resin container beverage according to one mode of embodiment of the present invention.

Modes of embodying the present invention will now be described with reference to the accompanying drawings. FIG. 1 is a side view illustrating schematically the external appearance of a resin container beverage, namely a PET bottled beverage 10, according to one mode of embodiment of the present invention. In this mode of embodiment, the PET bottled beverage 10 is for example a PET bottled beverage having an internal capacity of 500 ml, as is widely commercially available. However, the present invention is also applicable to PET bottled beverages having other internal capacities.

The PET bottled beverage 10 is provided with a resin container 11. The resin container 11 is provided with a container main body 12 in the shape of a bottomed circular cylinder forming an accommodating space in which a liquid beverage is accommodated. The container main body 12 is manufactured from a preform molded from a synthetic resin material such as transparent polyethylene terephthalate (PET) or the like, by stretch blow molding (biaxial stretch blow molding), for example. A detailed manufacturing method is discussed hereinafter.

The PET bottled beverage 10 is additionally provided with a resin cap 14 which is attached to a cylindrically shaped mouth portion 13 formed at the upper end of the container main body 12 and which hermetically seals the accommodating space in the container main body 12, and a resin label 15 fitted to part of the outer surface of the container main body 12. The cap 14 is formed from a synthetic resin material such as polypropylene (PP), and the label 15 is formed from a synthetic resin material such as polystyrene (PS). The label 15 may be formed form a heat-shrinkable shrink label.

Figure 2:
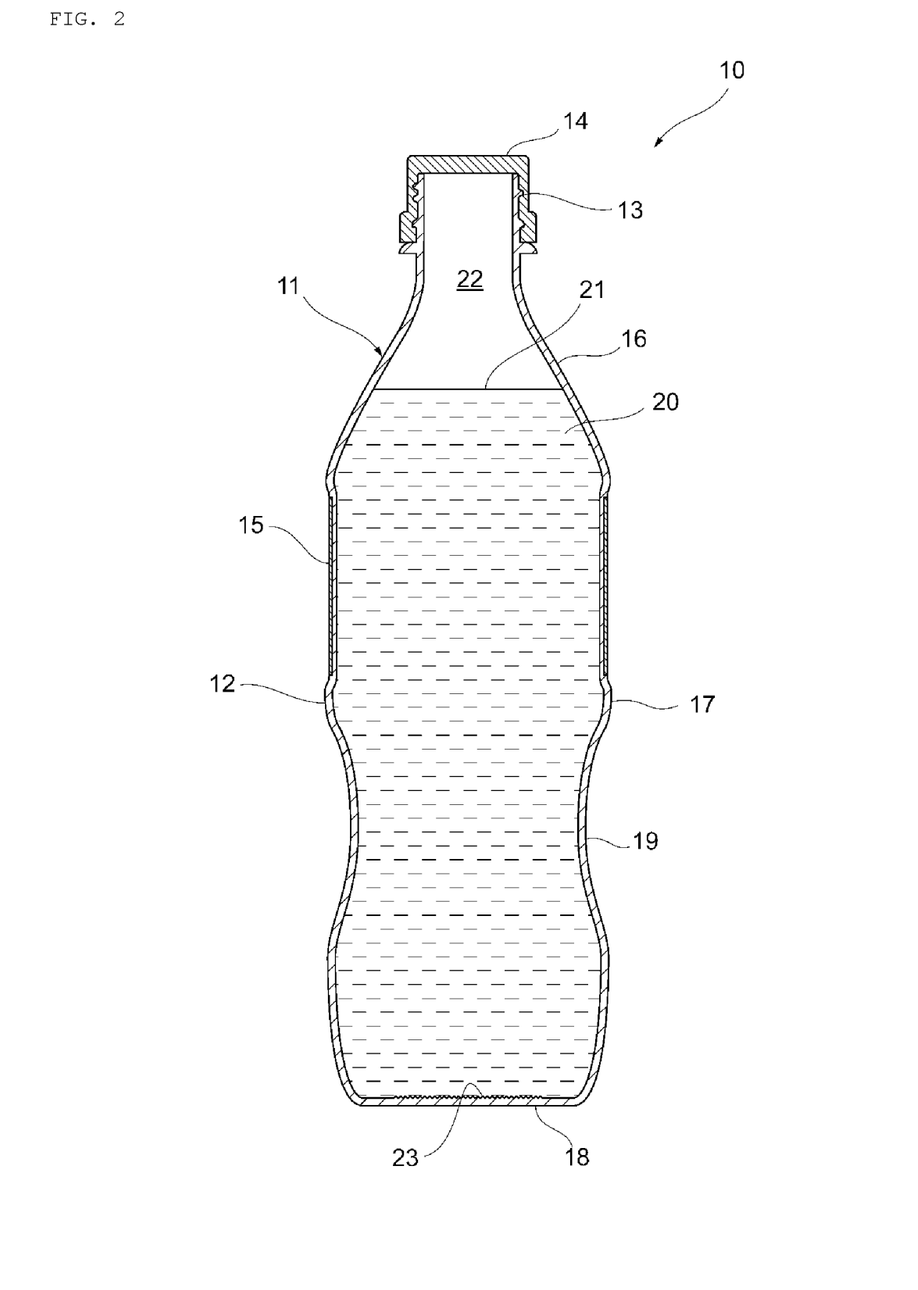
FIG. 2 is a cross-sectional view of the resin container beverage along the line 2-2 in FIG. 1.

FIG. 2 is a cross-sectional view of the PET bottled beverage 10 along the line 2-2 in FIG. 1. With reference to FIG. 1 and FIG. 2, the container main body 12 is provided with a substantially truncated cone-shaped shoulder portion 16 the diameter of which increases from the mouth portion 13 toward the lower end, in the height direction, of the container main body 12, a body portion 17 which extends substantially in the shape of a cylinder from the shoulder portion 16 toward the lower end, and a bottom portion 18 which occludes the lower end of the body portion 17. A recess 19 which is recessed toward the inside of the accommodating space in the container main body 12 may be formed in a region of part of the body portion 17. The label 15 is fitted to the body portion 17, extending over a region of part of the body portion 17 in the height direction of the container main body 12, above the recess 19, for example.

A liquid beverage, namely a carbonated beverage 20, is accommodated in the accommodating space in the container main body 12. The container main body 12 is filled with the carbonated beverage 12 using a known cold fill process, for example. The liquid level of the carbonated beverage 20, namely a content filling line 21, is set to a position between the upper end and the lower of the shoulder portion 16, for example. A space having a prescribed volume, namely a headspace 22, is formed in the container main body 12 above the content filling line 21. With the cap 14 unopened, the pressure of carbon dioxide gas that has dissolved into the carbonated beverage 20 is balanced by the pressure of gas in the headspace 22, thereby suppressing effervescence in the carbonated beverage 20.

Figure 3:
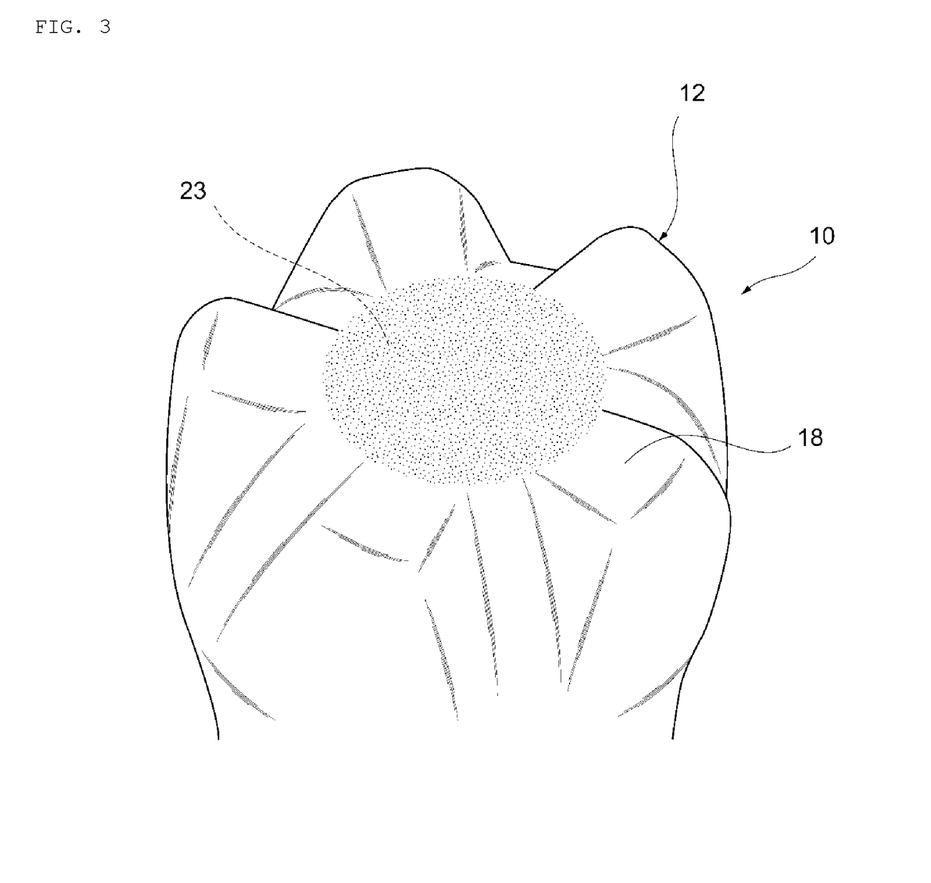
FIG. 3 is an oblique view illustrating schematically the bottom portion of a resin container beverage according to one mode of embodiment of the present invention.

FIG. 3 is an oblique view of the bottom portion 18 of the container main body 12 of the PET bottled beverage 10. With reference to FIG. 2 and FIG. 3, a textured region 23 is formed in a prescribed region on the inner surface (bottom surface) of the bottom portion 18. The textured region 23 is formed from a rough surface formed by means of fine irregularities, for example. The fine irregularities may consist of multiple fine protruding portions disposed on the inner surface of the bottom portion 18, for example, or one more fine grooves formed on the inner surface of the bottom portion 18, for example, or a combination thereof.

In this mode of embodiment, the textured region 23 is formed from multiple fine protruding portions disposed on the inner surface of the bottom portion 18. The textured region 23 extends in the shape of a circle, an ellipse or a polygon (for example a pentagon or a hexagon) covering an area of between approximately 1.4% and approximately 80% of the total surface area of the bottom portion 18, when the bottom portion 18 is seen from below in a plan view, for example. In this mode of embodiment the textured region 23 is formed on the inner surface of the bottom portion 18 from a region extending in the shape of a circle having an area of approximately 20% of the total surface area of the bottom portion 18, as will be apparent from FIG. 3.

According to tests conducted by the inventors, the roughness of the fine irregularities in the textured region 23 is preferably set within a range of an arithmetic mean roughness (Ra) of between 0.8 and 7.0, for example, a ten-point mean roughness (Rz) of between 4 and 25, for example, and a mean spacing (Rsm) of between 100 and 500, for example, from the viewpoint of promoting the generation of carbon dioxide gas effervescence. It should be noted that according to tests conducted by the inventors, the generation of carbon dioxide gas effervescence can be further promoted by setting the roughness of the irregularities in particular within a range of an arithmetic mean roughness (Ra) of between 1.1 and 5.5, for example, a ten-point mean roughness (Rz) of between 5 and 17, for example, and a mean spacing (Rsm) of between 100 and 450, for example.

A first method of manufacturing the resin container 11 according to this mode of embodiment will now be described. First, the resin container 11 is manufactured from a resin preform 25 such as that illustrated in FIG. 4. The preform 25 is provided with a mouth portion 26 and a main body portion 27 in the shape of a bottomed cylinder extending downward from the mouth portion 26 in the shape of a circular cylinder. The size of the mouth portion 26 of the preform 25 corresponds to the size of the mouth portion 13 of the resin container 11. The preform is formed from a synthetic resin material such as transparent polyethylene terephthalate (PET), by injection molding.

Figure 4:
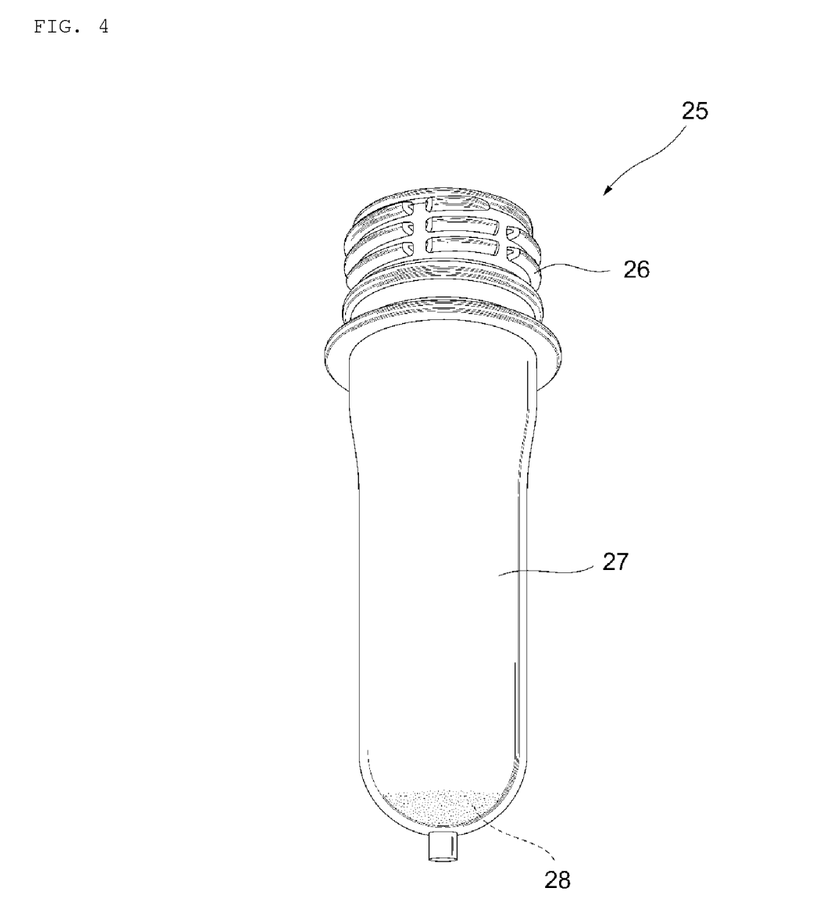
FIG. 4 is an oblique view illustrating schematically the external appearance of a resin preform according to one mode of embodiment of the present invention.

A lower portion, namely a bottom portion, of the main body portion 27 is formed for example in the shape of a hemisphere. A textured pattern 28 formed from a rough surface formed using fine irregularities is formed on the inner surface of the hemispherical bottom portion of the main body portion 27. The textured pattern 28 may be formed in part of the hemispherical surface of the bottom surface of the main body portion 27 (for example a hemisphere including the lower end of the hemispherical surface), as illustrated in FIG. 4, or may be formed in the shape of a circular cylinder extending from the hemispherical surface of the bottom portion of the main body portion 27 to a prescribed height in the main body portion 27 in the direction toward the mouth portion 26.

The surface area and external shape of the region in which the textured pattern 28 is formed should be determined in accordance with the surface area and the external shape of the textured region 23 in the resin container 11 to be manufactured from the preform 25. As discussed herein below, the resin container 11 is molded by biaxial stretch blow molding of the preform 25, and therefore the surface area and the external shape of the textured region 23 change (for example expand) from the surface area and the external shape of the textured pattern 28. Therefore the surface area and the external shape of the textured region 23 should be determined taking into account such changes in the textured pattern 28.

Further, the shape and roughness (size) of the fine irregularities of the textured pattern 28 should be determined in accordance with the shape and roughness of the fine irregularities of the textured region 23 in the resin container 11. In the same way as discussed hereinabove, changes in the surface area and the external shape of the textured pattern 28 should be taken into account when carrying out this determination. In this mode of embodiment, the roughness of the irregularities in the textured pattern 28 is preferably set within a range of an arithmetic mean roughness (Ra) of between 4 and 11, for example, a ten-point mean roughness (Rz) of between 15 and 50, for example, and a mean spacing (Rsm) of between 100 and 400.

Figure 6:
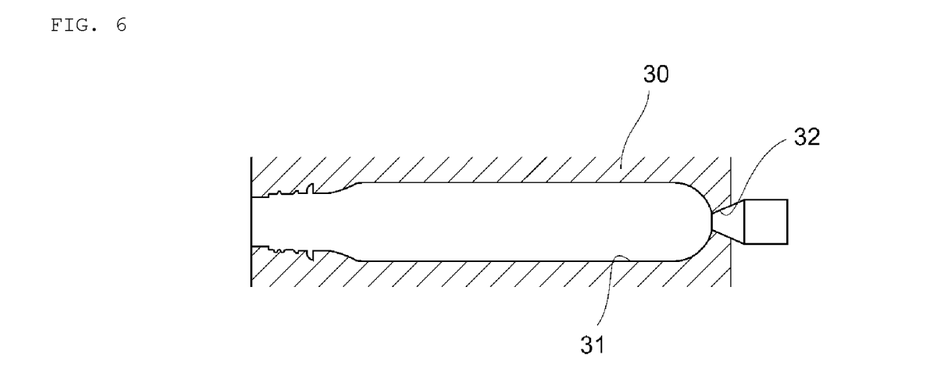
FIG. 6 is a cross-sectional view of a die used to injection-mold a preform.
Figure 7:
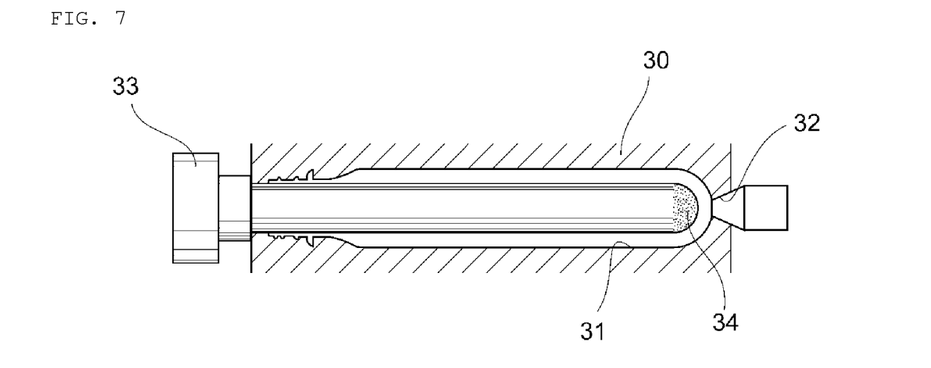
FIG. 7 is a cross-sectional view of the die used to injection-mold the preform.

FIG. 6 is a cross-sectional view of an injection-molding die 30 used to injection-mold the preform 25. A cavity 31 patterned after the contours of the outer surface of the preform 25 is formed in the die 30. A gate 32 for injecting a heat-melted synthetic resin material into the cavity 31 is coupled to one end, in the longitudinal direction, of the cavity 31, and the other end thereof is open. As illustrated in FIG. 7, prior to filling with the synthetic resin material, a column-shaped inner core 33 is inserted into the cavity 31 from the open other end of the cavity 31, hermetically sealing the cavity 31. A prescribed gap is formed between the outer surface of the inner core 33 and the inner surface of the cavity 31. The contours of the space are patterned after the contours of the preform 25.

As will be apparent from FIG. 7, a texture-imparting pattern 34 formed comprising a rough surface formed from fine irregularities is formed on a hemispherical surface at the distal end, in the longitudinal direction, of the columnar inner core 33. The shape and roughness (size) of the fine irregularities of the texture-imparting pattern 34, and the surface area and the external shape of the region in which the texture-imparting pattern 34 is formed are determined in accordance with the textured pattern 28 in the preform 25. To form the texture-imparting pattern 34, the inner core 33 is subjected to peening, for example, whereby small pieces of metal are caused to impact the distal end of the inner core 33 at high speed.

Figure 5:
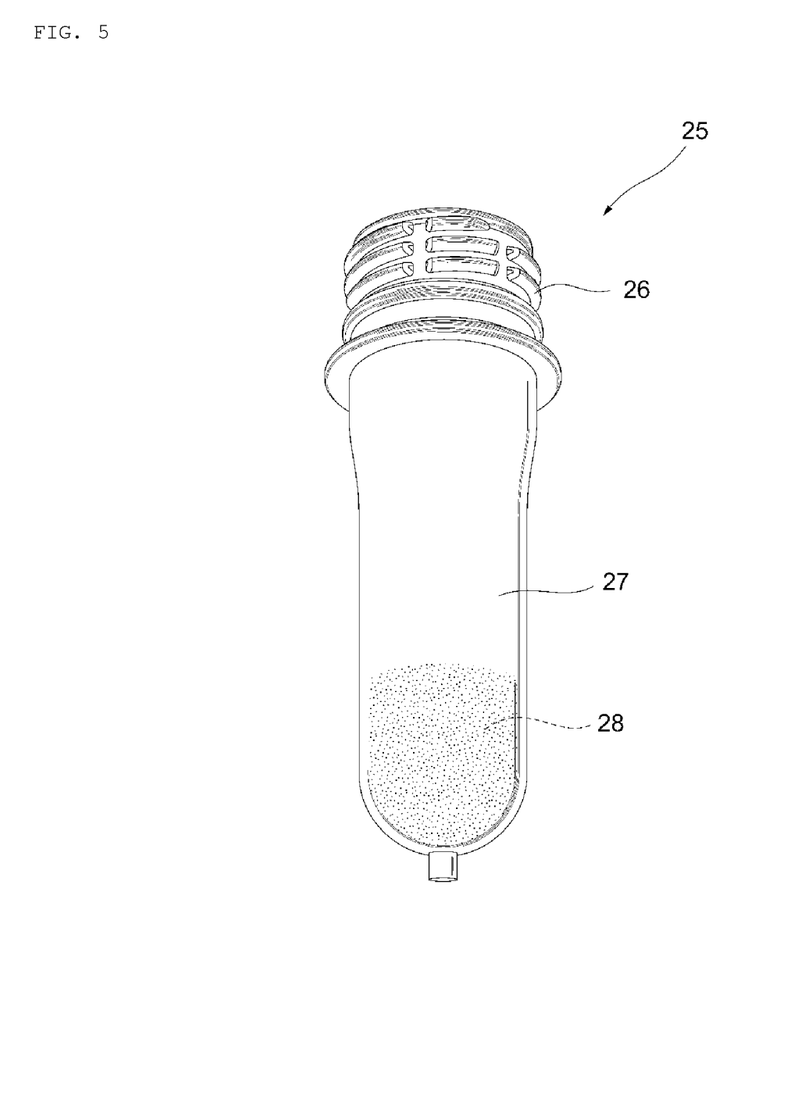
FIG. 5 is an oblique view illustrating schematically the external appearance of a resin preform according to another mode of embodiment of the present invention.
Figure 8:
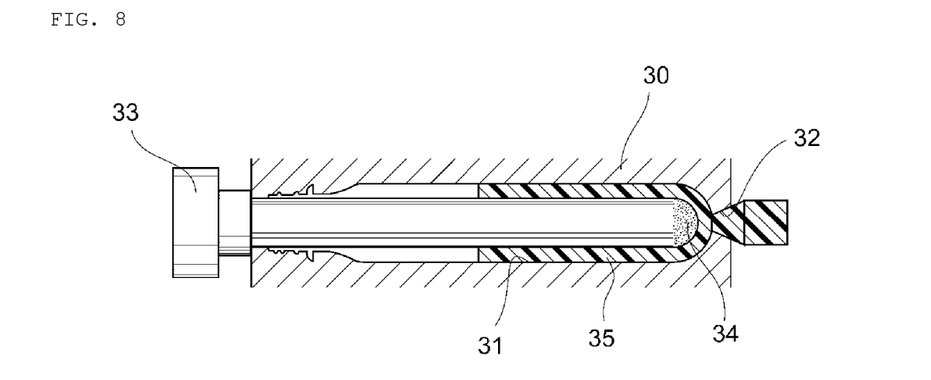
FIG. 8 is a cross-sectional view of the die used to injection-mold the preform.

As illustrated in FIG. 8, a molten synthetic resin material 35 is injected into the cavity 31. When the synthetic resin material 35 has been cooled and cured in the cavity 31, the inner core 33 is pulled out from the cavity 31. The preform 25 is formed in this way. The textured pattern 28 is formed on the hemispherical bottom surface of the preform 25 by being transferred from the texture-imparting pattern 34 on the inner core 33. It should be noted that when forming the preform 25 illustrated in FIG. 5, the surface area and the external shape of the texture-imparting pattern 34 at the distal end of the inner core 33 should be modified. The preform 25 is then extracted from the die 30 by separating the die 30, for example (this is not shown in the drawings).

Figure 9:
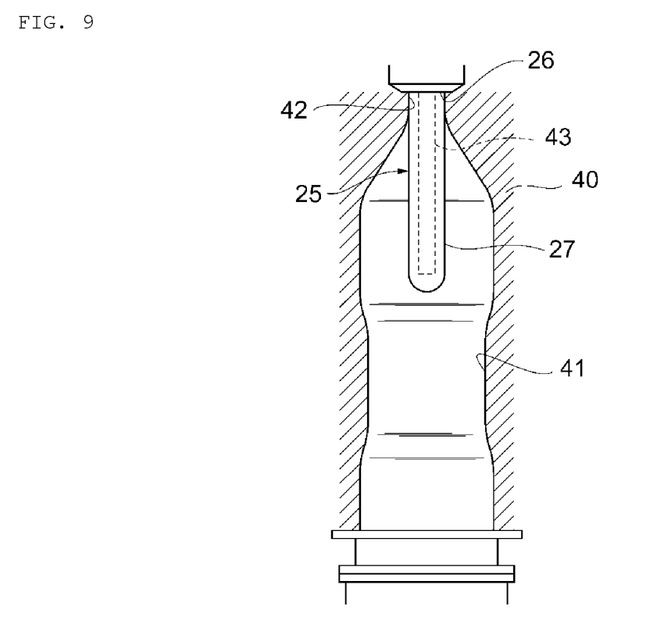
FIG. 9 is a cross-sectional view of a die used to blow-mold a resin container.

Molding of the resin container 11 will now be described. As illustrated in FIG. 9, first the preform 25 discussed hereinabove is disposed in a cavity 41 of a biaxial stretch blow molding die 40. The cavity 41 is formed in a shape patterned after the contours of the resin container 11. Before being disposed in the cavity 41, the main body portion 27 of the preform 25 is heated to approximately 100° C., for example. The mouth portion 26 of the preform 25 is fitted to a mouth portion 42, which is an open end of the die 40, thereby securing the preform 25 in the die 40. Meanwhile, the main body portion 27 is disposed in the cavity 41.

Figure 10:
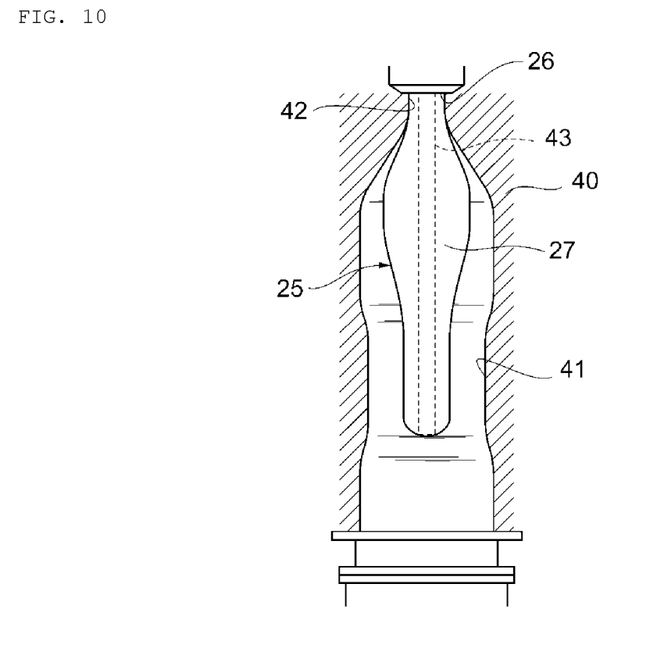
FIG. 10 is a cross-sectional view of the die used to blow-mold the resin container.

At this time, a stretch rod 43 is inserted from the mouth portion 26 into the main body portion 27 along the central axis of the cylinder of the main body portion 27 of the preform 25. Next, as illustrated in FIG. 10, the distal end of the stretch rod 43 is pressed against the bottom surface of the main body portion 27, toward the bottom surface of the cavity 41, thereby causing the main body portion 27 to be stretched mechanically in the longitudinal direction toward the bottom surface of the cavity 41. At the same time, low-pressure air is caused to flow into the main body portion 27, thereby stretching the main body portion 27 in the lateral direction, radially with respect to the central axis of the main body portion 27, from the central axis.

Figure 11:
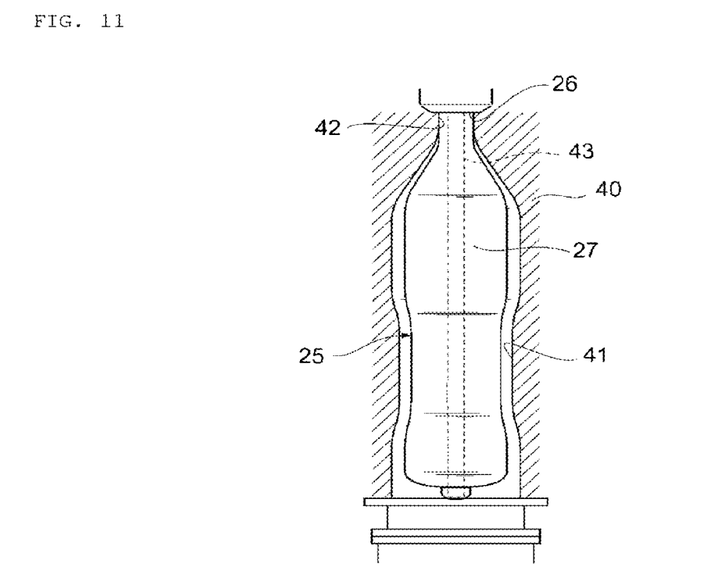
FIG. 11 is a cross-sectional view of the die used to blow-mold the resin container.

Next, as illustrated in FIG. 11, the preform 25 is stretched in the longitudinal direction until the distal end of the stretch rod 43 reaches the bottom surface of the cavity 41, and the main body portion 27 is further stretched radially in the lateral direction from the central axis of the main body portion 27 by pre-blowing. After lateral stretching and longitudinal stretching have been completed in this way (after the completion of pre-blowing), next high-pressure air is caused to flow into the preform 25 (high-pressure blowing), thereby stretching the main body portion 27 of the preform 25 further in the longitudinal direction and the lateral direction.

Figure 12:
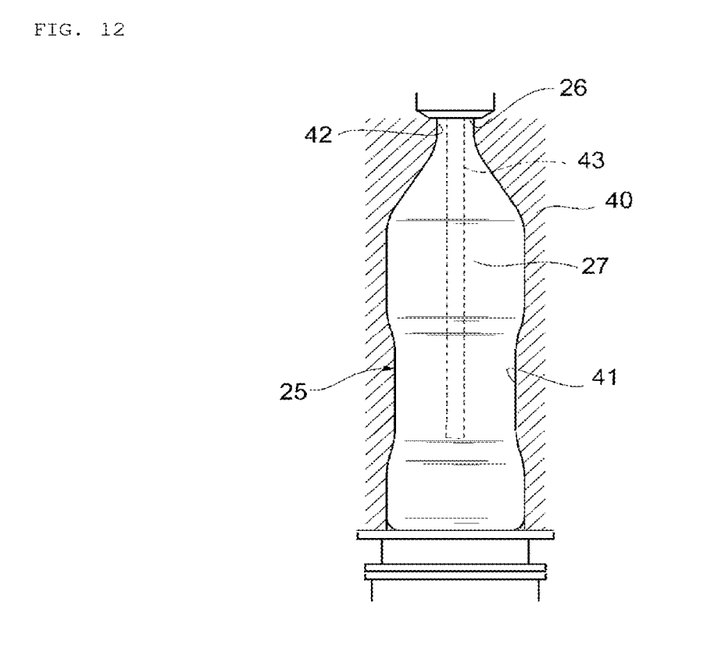
FIG. 12 is a cross-sectional view of the die used to blow-mold the resin container.

As illustrated in FIG. 12, high-pressure blowing is completed by stretching the preform 25 in the longitudinal direction and the lateral direction until the entire outer surface of the main body portion 27 has been pressed against the entire inner surface of the cavity 41. The stretch rod 43 is then extracted from the die 40. The resin container 11 is formed from the preform 25 in this way. The textured region 23 is formed in the container main body 12 of the resin container 11 on the basis of the textured pattern 28 formed in the preform 25.

According to the first method of manufacture described hereinabove, by biaxial stretch blow molding the resin container 11 using the preform 25 to which the textured pattern 28 has been transferred in advance, it is possible for the resin container 11 having the textured region 23 on the inner surface thereof to be manufactured simply. Further, by using the inner core 33 having the texture-imparting pattern 34 at the distal end thereof, it is possible for the textured pattern 28 to be transferred simply onto the inner surface of the bottom portion of the preform 25. Therefore the resin container 11 according to this mode of embodiment can be manufactured simply, without the need for significant changes to the conventional manufacturing facilities, and therefore increases in the manufacturing cost can be reliably suppressed.

Figure 13:
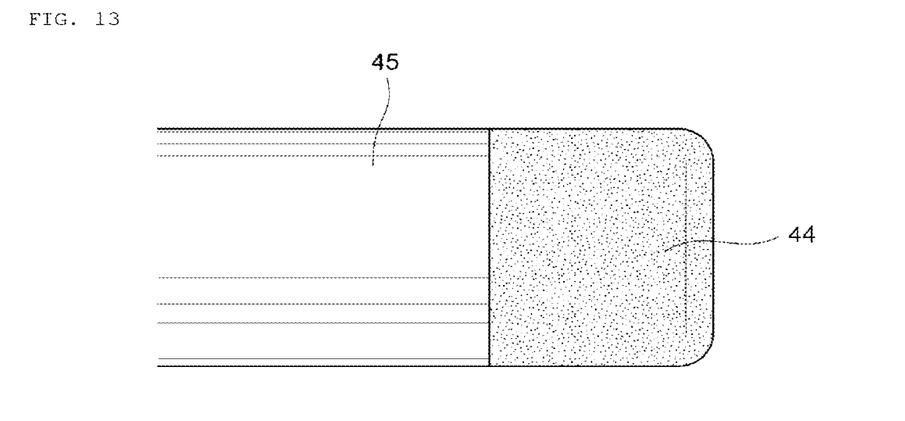
FIG. 13 is a cross-sectional view of the distal end of a stretch rod used when blow-molding the resin container.

It should be noted that as an alternative to the first method of manufacture described hereinabove, the resin container 11 may also be manufactured using the following second method of manufacturing. In the second method of manufacturing, a conventional preform without the textured pattern 28 is used instead of the preform 25 discussed hereinabove. The construction of the conventional preform is the same as that of the preform 25 except for the lack of the textured pattern 28. As illustrated in FIG. 13, instead of the stretch rod 43 discussed hereinabove, the second method of manufacturing employs, during molding of the resin container 11, a stretch rod 45 at the distal end of which a texture-imparting pattern 44, formed from a rough surface comprising fine irregularities, has been formed.

The rough surface of the texture-imparting pattern 44 has a similar roughness to that of the texture-imparting pattern 34 in the inner core 33 discussed hereinabove, for example. In this mode of embodiment the stretch rod 45 is formed in the shape of a column, and the texture-imparting pattern 44 is formed over a prescribed zone extending from the distal end surface of the stretch rod 45 toward the base end side of the stretch rod 45. The shape and size of the fine irregularities of the texture-imparting pattern 44, and the surface area and the external shape of the region in which the texture-imparting pattern 44 is formed should be determined in accordance with the textured region 23 in the resin container 11.

In the second method of manufacture, during molding of the resin container 11 the distal end of the stretch rod 45 is pressed against the bottom surface of the main body portion of the known preform in the same way as in the first method of manufacture discussed hereinabove. When the preform is mechanically stretched in the longitudinal direction until the distal end of the stretch rod 45 reaches the bottom surface of the cavity 41, the fine irregularities of the texture-imparting pattern 44 on the stretch rod 45 are transferred to the bottom surface of the main body portion of the molten preform. As a result, the resin container 11 having the textured region 23 on the bottom surface thereof can be molded in the same way as in the first method of manufacture discussed hereinabove.

According to the second method of manufacture described hereinabove, by biaxial stretch blow molding the resin container 11 using the stretch rod 45 on which the texture-imparting pattern 44 has been formed, it is possible for the resin container 11 having the textured region 23 on the inner surface thereof to be manufactured simply. Further, by using the stretch rod 45 having the texture-imparting pattern 44 at the distal end thereof, it is possible for the textured region 23 to be transferred simply onto the inner surface of the bottom portion of the resin container 11. Therefore the resin container 11 according to this mode of embodiment can be manufactured simply, without the need for significant changes to the conventional manufacturing facilities, and therefore increases in the manufacturing cost can be reliably suppressed.

It should be noted that the second method of manufacture may be implemented in combination with the first method of manufacture discussed hereinabove. To elaborate, the preform 25 having the textured pattern 28 may be used when biaxial stretch blow molding is being performed using the stretch rod 45 to mold the resin container 11. In this way, the resin container 11 having the textured region 23 can be molded by additionally transferring the irregularities of the texture-imparting pattern 44 on the stretch rod 45 onto the bottom surface of the preform 25 which has been provided in advance with the irregularities of the textured pattern 28.

When the PET bottled beverage 10 manufactured as described hereinabove is hermetically sealed during manufacture using the cap 14, pressure equilibrium is established between the carbonated beverage 20 and the headspace 22 in the container main body 12, stabilizing the carbon dioxide gas in the carbonated beverage 20. When the consumer opens the cap 14, the pressure equilibrium breaks down and the carbon dioxide gas in the carbonated beverage 20 effervesces. At this time, more effervescence than hitherto is generated in the carbon dioxide gas as a result of contact with the textured region 23. As a result, the refreshing feeling of the carbonated beverage 20 can be produced to a greater extent, and the feeling on the tongue and the flavor of the carbonated beverage 20 can be accentuated to a greater extent than hitherto.

Figure 14:
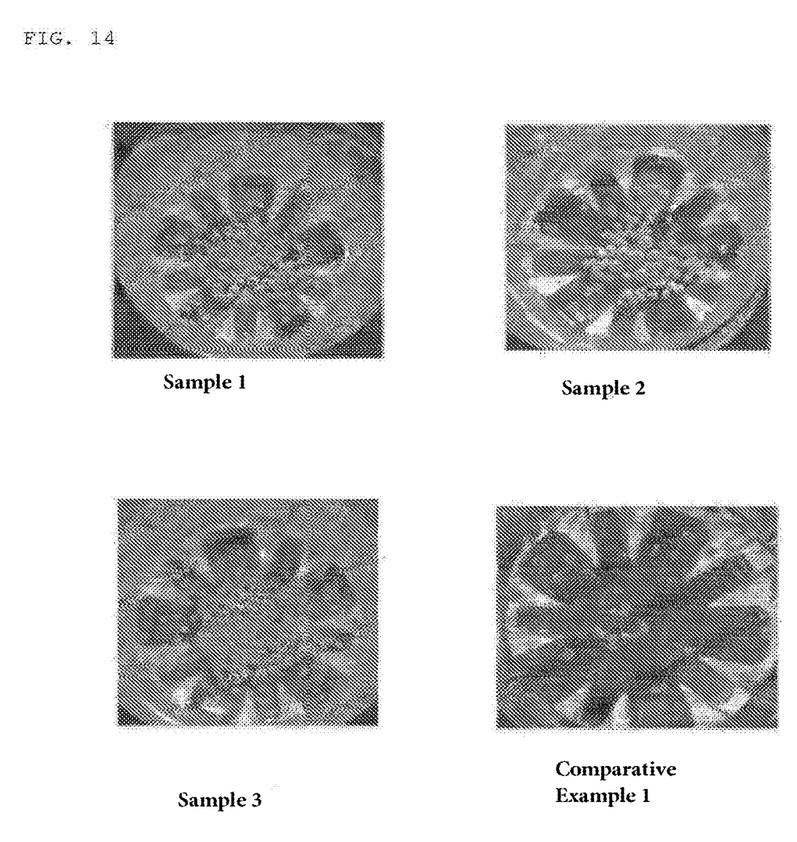
FIG. 14 is a set of photographs illustrating the results of tests of the effect of forming a textured region according to the present invention.

The inventors tested the effect of the textured region 23 in the PET bottled beverage 10 according to this mode of embodiment. For the tests, samples 1 to 3 of the resin container 11 according to this mode of embodiment were prepared together with a comparative example 1 of a resin container according to a comparative example. The container main body 12 in sample 1 was manufactured using the first method of manufacture. The container main body 12 in sample 2 was manufactured using the second method of manufacture. The container main body 12 in sample 3 was manufactured by combining the first and second methods of manufacture. The container main body in comparative example 1 was manufactured using a conventional method of manufacture. To elaborate, the textured region was not formed in the container main body of comparative example 1.

In the tests, the irregularity roughness in the textured region 23 was set to be the same in samples 1 to 3. Further, for the container main bodies used in each of samples 1 to 3 and comparative example 1, the upper half of the body portion in the container main body was cut off to form a container main body formed from only the lower half including the bottom portion of the container main body. The degree of effervescence of carbon dioxide gas was visually observed immediately after a prescribed amount of a transparent carbonated beverage (for example Sprite (registered trademark)) that had been cooled to 2° C., for example, was poured gently into the container main bodies.

FIG. 14 is a set of photographs illustrating the test results. These photographs were taken from directly above the container main body immediately after the Sprite was poured. As will be apparent from the test results in FIG. 14, there was almost no carbon dioxide gas effervescence in comparative example 1. Meanwhile, it was observed that in samples 1 to 3 effervescence had increased noticeably compared with comparative example 1. In particular, effervescence was greater in sample 1, using the first method of manufacture, than in sample 2, using the second method of manufacture. Further, an increased amount of finer effervescence was observed in sample 3, using a combination of the first and second methods of manufacture, than in sample 1 or sample 2.

According to test results such as those described hereinabove, it was found that effervescence of carbon dioxide gas can be reliably increased by forming the textured region 23 on the bottom surface of the container main body 12 in accordance with the present invention. Further, it was found that the effervescence increases more markedly when the irregularities of the textured pattern 28 in the preform 25 are combined with the irregularities transferred from the texture-imparting pattern 44 on the stretch rod 45, using a container main body 12 manufactured by combining the first and second methods of manufacture.

In the PET bottled beverage 10 described hereinabove, the textured region 23 was formed on the inner surface of the bottom portion 18 of the container main body 12, but the textured region 23 may, for example, be formed on an inner surface other than that of the bottom portion 18 of the container main body 12. In this case, the texture-imparting pattern 34 should be formed on the outer peripheral surface of the column of the inner core 33, for example, corresponding to the region in which it is desired to form the textured region 23. As one example, the textured region 23 may be formed on the inner surface of the container main body 21 in a region corresponding to the label 15 in the body portion 17 of the container main body 21, for example. The same operational advantages as those discussed hereinabove can also be achieved using such a configuration.

The invention claimed is:

1. A resin container comprising:
   a resin container main body inside which is formed an accommodating space that is hermetically sealed using a cap; and
   a textured region which is formed on an inner surface of the container main body and is formed from a rough surface comprising fine irregularities having an arithmetic mean roughness (Ra) of between 0.8 micrometers and 7.0 micrometers, a ten-point mean roughness (Rz) of between 4 micrometers and 25 micrometers, and a mean spacing (Rsm) of between 100 micrometers and 500 micrometers.

2. The resin container as claimed in claim 1, wherein the textured region is formed on a bottom surface of the container main body.

3. The resin container of claim 1, wherein the fine irregularities comprise multiple fine protruding portions or one or more fine grooves formed on the inner surface of the container main body.

4. The resin container of claim 1, wherein the textured region is in the shape of a circle, an ellipse, or a polygon.

5. The resin container of claim 1, wherein the ten-point mean roughness (Rz) is between 5 micrometers and 17 micrometers.

6. The resin container of claim 1, wherein the mean spacing (Rsm) is between 100 micrometers and 450 micrometers.

7. The resin container of claim 2, wherein the textured region covers from approximately 1.4% to approximately 80% of the total surface area of the bottom portion of the main body.

8. The resin container of claim 1, wherein the resin container further comprises a carbonated beverage.

9. The resin container of claim 1, wherein the arithmetic mean roughness (Ra) is between 1.1 micrometers and 5.5 micrometers, the ten-point mean roughness (Rz) is between 5 micrometers and 17 micrometers, and the mean spacing (Rsm) is between 100 micrometers and 450 micrometers.

10. A resin container for a beverage comprising:
    a carbonated beverage;
    a resin container main body inside which is formed an accommodating space in which the carbonated beverage is accommodated;
    a cap which is attached to a mouth portion of the container main body and which hermetically seals the accommodating space; and
    a textured region which is formed on an inner surface of the container main body and is formed from a rough surface comprising fine irregularities having an arithmetic mean roughness (Ra) of between 0.8 micrometers and 7.0 micrometers, a ten-point mean roughness (Rz) of between 4 micrometers and 25 micrometers, and a mean spacing (Rsm) of between 100 micrometers and 500 micrometers.

11. The resin container of claim 10, wherein the arithmetic mean roughness (Ra) is between 1.1 micrometers and 5.5 micrometers, the ten-point mean roughness (Rz) is between 5 micrometers and 17 micrometers, and the mean spacing (Rsm) is between 100 micrometers and 450 micrometers.

12. A method for manufacturing a resin container, comprising:
    preparing a resin preform having on an inner surface of a main body portion of the resin preform a textured pattern formed from a rough surface comprising fine irregularities having an arithmetic mean roughness (Ra) of between 4 micrometers and 11 micrometers; and
    stretching the preform by blow molding, to mold the resin container having on an inner surface thereof a textured region formed from the rough surface comprising fine irregularities having an arithmetic mean roughness (Ra) of between 0.8 micrometers and 7.0 micrometers, a ten-point roughness (Rz) of between 4 micrometers and 25 micrometers, and a mean spacing (Rsm) of between 100 micrometers and 500 micrometers.

13. A method for manufacturing a resin container, comprising:
    disposing in a cavity of a die a resin preform having a main body portion in the shape of a bottomed cylinder; and
    inserting into the preform a stretch rod having on a distal end thereof a texture-imparting pattern formed from a rough surface comprising fine irregularities having an arithmetic mean roughness (Ra) of between 4 micrometers and 11 micrometers;
    blow-molding the resin container by stretching the preform while pressing the distal end of the stretch rod against the bottom surface of the main body comprising fine irregularities having an arithmetic mean roughness (Ra) of between 0.8 micrometers and 7.0 micrometers, a ten-point roughness (Rz) of between 4 micrometers and 25 micrometers, and a mean spacing (Rsm) of between 100 micrometers and 500 micrometers.

* * * * *